United States Patent
Son

(10) Patent No.: US 12,358,555 B2
(45) Date of Patent: Jul. 15, 2025

(54) APPARATUS FOR CONTROLLING DRIVE UNIT ACCORDING TO POSITION OF SHUTTLE LEVER OF AGRICULTURAL MACHINE SUPPORTING AUTONOMOUS DRIVING

(71) Applicant: GINT CO., LTD., Gyeonggi-do (KR)

(72) Inventor: Seung Rak Son, Gyeonggi-do (KR)

(73) Assignee: GINT CO., LTD., Gyeonggi-do (KR)

( * ) Notice: Subject to any disclaimer, the term of this patent is extended or adjusted under 35 U.S.C. 154(b) by 0 days.

(21) Appl. No.: 18/763,057

(22) Filed: Jul. 3, 2024

(65) Prior Publication Data
US 2024/0351633 A1 Oct. 24, 2024

Related U.S. Application Data

(63) Continuation of application No. PCT/KR2023/004042, filed on Mar. 27, 2023.

(30) Foreign Application Priority Data

Mar. 29, 2022 (KR) .......................... 10-2022-0038805

(51) Int. Cl.
| | |
|---|---|
| *A01B 69/00* | (2006.01) |
| *A01B 69/04* | (2006.01) |
| *B62D 6/00* | (2006.01) |
| *F16H 59/10* | (2006.01) |

(Continued)

(52) U.S. Cl.
CPC ............ *B62D 6/007* (2013.01); *A01B 69/008* (2013.01); *F16H 59/10* (2013.01); *G01D 5/16* (2013.01); *G05G 5/05* (2013.01); *G05G 2505/00* (2013.01)

(58) Field of Classification Search
None
See application file for complete search history.

(56) References Cited

U.S. PATENT DOCUMENTS

| | | | | |
|---|---|---|---|---|
| 9,797,247 | B1* | 10/2017 | Nelson | .............. E21F 13/02 |
| 2006/0015235 | A1* | 1/2006 | Ringger | ............ F16H 59/105 |
| | | | | 701/51 |
| 2017/0010619 | A1* | 1/2017 | Foster | .................. B60T 7/00 |

(Continued)

FOREIGN PATENT DOCUMENTS

| | | |
|---|---|---|
| JP | 2015222502 A | 12/2015 |
| JP | 2018163507 A | 10/2018 |

(Continued)

OTHER PUBLICATIONS

"KR App. No. 10 2022 0038805 Notice of Allowance", with English Translation, Jun. 14, 2022, 4 pgs.

(Continued)

*Primary Examiner* — Truc M Do
(74) *Attorney, Agent, or Firm* — Guntin & Gust, PLC; Miyoung Shin

(57) ABSTRACT

The present disclosure relates to an apparatus for controlling a drive unit according to the position of a shuttle lever of an agricultural machine supporting autonomous driving. Specifically, the present disclosure relates to an apparatus for providing a transition between autonomous driving and manual driving by newly defining the position between forward and neutral or between neutral and reverse for an agricultural machine shuttle lever configured in a forward-neutral-reverse structure.

10 Claims, 5 Drawing Sheets

(51) Int. Cl.
 *G01D 5/16* (2006.01)
 *G05G 5/05* (2006.01)

(56) References Cited

U.S. PATENT DOCUMENTS

| | | | |
|---|---|---|---|
| 2019/0317500 | A1 | 10/2019 | Foster et al. |
| 2020/0130568 | A1* | 4/2020 | Kim .................. H03K 17/9517 |
| 2021/0276560 | A1* | 9/2021 | Hirosawa ............ B60W 30/143 |

FOREIGN PATENT DOCUMENTS

| | | | |
|---|---|---|---|
| JP | 2019004854 | A | 1/2019 |
| JP | 2021002389 | A | 1/2021 |
| KR | 20140043536 | A | 4/2014 |
| KR | 10-1968088 | | 4/2019 |
| KR | 20190091329 | A | 8/2019 |
| KR | 20210047965 | A | 4/2021 |
| KR | 10-2431627 | B1 | 8/2022 |

OTHER PUBLICATIONS

"PCT/KR2023/004042 International Search Report—ISR", Jul. 12, 2023, 4 pgs.

\* cited by examiner

APPARATUS FOR CONTROLLING DRIVE UNIT ACCORDING TO POSITION OF SHUTTLE LEVER OF AGRICULTURAL MACHINE SUPPORTING AUTONOMOUS DRIVING

CROSS-REFERENCE TO RELATED APPLICATION

This application is a continuation of PCT Application No. PCT/KR2023/004042, filed on Mar. 27, 2023 which claims priority to and the benefit of Korean Patent Application No. 10-2022-0038805, filed on Mar. 29, 2022, the disclosure of which are incorporated herein by reference in their entirety.

FIELD OF THE DISCLOSURE

Embodiments of the present disclosure relate to an apparatus for controlling a drive unit according to a position of a shuttle lever of an agricultural machine that supports autonomous driving. Specifically, embodiments of the present disclosure relate to an apparatus for providing switching between autonomous driving and manual driving as a position between drive and neutral or a position between neutral and reverse is newly defined in a shuttle lever including a drive-neutral-reverse structure of an agricultural machine.

DISCUSSION OF RELATED ART

Agricultural machines are treated as very important elements to reduce high labor burden and production costs in accordance with labor shortage due to the decrease in and aging of the working population in rural areas. The agricultural machines are intended to perform various works required for farming, capable of performing various types of works such as plowing, rotary work, pest control, and transplanting work, and classified into walk-behind work machines that workers operate while walking along with the agricultural machines and riding-type work machines that workers operate while sitting on drivers' seats provided on the agricultural machines.

With the development of information technology, technologies for autonomous driving for the agricultural machine are being developed. The autonomous driving for the agricultural machine is intended to allow the agricultural machine to automatically perform work while moving along a set work route, and thus it is expected that the fatigue of a driver caused by a simple operation can be decreased and the work efficiency can be increased in working using the agricultural machine.

As a plurality of agricultural machines being currently supplied are manufactured based on manual driving, it is not easy to supply new agricultural machines that can perform the autonomous driving, and thus the autonomous driving of the agricultural machine is being developed in a manner of coupling an electronic device that supports the autonomous driving to an agricultural machine manufactured for manual driving.

A shuttle lever of the agricultural machine includes a drive-neutral-reverse lever structure, which is somewhat different from the shifting lever of a vehicle. In the manual driving, the shuttle lever is positioned in any one of drive, neutral, and reverse according to a driver's intention for drive, neutral, or reverse, and thus a drive unit of the agricultural machine is controlled to perform drive, neutral, and reverse. However, in the autonomous driving, a command of an autonomous tractor controller (ATC), a position of the shuttle lever, and the driver's intention may be different. The autonomous driving of the agricultural machine is being developed in a manner of coupling the electronic device that supports the autonomous driving to the agricultural machine manufactured based on the manual driving. Thus, an apparatus that can determine a control direction of the drive unit in relation to the position of the shuttle lever in an autonomous driving state is required.

Further, in the agricultural machine that performs both the manual driving and the autonomous driving, when switching between the manual driving and the autonomous driving can be controlled using the shuttle lever that is a component present in the existing agricultural machine, separate additional control components are not required in the agricultural machine. Thus, an apparatus that can control the switching between the manual driving and the autonomous driving of the agricultural machine using the shuttle lever is required.

SUMMARY

On the basis of the above discussion, various embodiments of the present disclosure are directed to providing an apparatus for controlling a drive unit according to a position of a shuttle lever of an agricultural machine that supports autonomous driving.

Various embodiments of the present disclosure are directed to providing an apparatus for providing switching between autonomous driving and manual driving as a position between drive and neutral or a position between neutral and reverse is newly defined in a shuttle lever including a drive-neutral-reverse structure of an agricultural machine.

Various embodiments of the present disclosure are directed to providing an apparatus capable of determining a control direction of a drive unit in relation to a position of a shuttle lever in an autonomous driving state of an agricultural machine.

Various embodiments of the present disclosure are directed to providing an apparatus capable of controlling switching between manual driving and autonomous driving of an agricultural machine using a shuttle lever.

Various embodiments of the present disclosure provide an electronic device included in an agricultural machine, the electronic device including a shuttle lever that is manipulatable to be fixed to one of three positions of drive, neutral, and reverse, a sensor that senses a position of the shuttle lever, a transceiver electrically connected to a drive control device including a drive unit of the agricultural machine, and at least one processor electrically connected to the transceiver and the sensor, wherein the processor controls the transceiver to receive information indicating whether the agricultural machine is operated in autonomous driving or manual driving from the drive control device, controls the sensor to sense the position of the shuttle lever, and transmit, to the drive control device, manual switching control information that allows the drive unit to operate to be switched from the autonomous driving to the manual driving when the shuttle lever is continuously positioned between the drive and the neutral or between the reverse and the neutral for a predetermined time interval or more during the autonomous driving of the agricultural machine.

In one embodiment, the shuttle lever may not be fixedly positioned between the drive and the neutral or between the reverse and the neutral, and the shuttle lever may be continuously positioned between the drive and the neutral or between the reverse and the neutral for a predetermined time interval only when a user holds the shuttle lever between the drive and the neutral or between the reverse and the neutral.

In one embodiment, when the shuttle lever is manipulated to one of the three positions of the drive, the neutral, and the reverse, the shuttle lever may be fixedly positioned at a manipulated position before a subsequent manipulation, and when the shuttle lever is manipulated between the drive and the neutral or between the reverse and the neutral, when the user does not hold the shuttle lever, the shuttle lever may be configured to return to the position of the neutral.

In one embodiment, the processor may be further configured to control the transceiver to transmit, to the drive control device, control information that allows the drive unit to operate the drive or the reverse when the shuttle lever is positioned in the drive or the reverse during the manual driving of the agricultural machine.

In one embodiment, the processor may be further configured to control the transceiver to transmit, to the drive control device, control information that allows the drive unit to be operated based on the autonomous driving regardless of the position of the shuttle lever when the shuttle lever is positioned in the drive or the reverse during the autonomous driving of the agricultural machine.

In one embodiment, the processor may be configured to transmit, to the drive control device, autonomous switching control information that allows the drive unit to operate to be switched from the manual driving to the autonomous driving when the shuttle lever is continuously positioned between the drive and the neutral or between the reverse and the neutral for a predetermined time interval or more during the manual driving of the agricultural machine.

In one embodiment, the sensor may include a variable resistor, and the variable resistor may be configured such that a value of the variable resistor may be changed according to the position of the shuttle lever. The sensor may be configured to sense the position of the shuttle lever according to the value of the variable resistor.

In one embodiment, when the processor transmits, to the drive control device, the manual switching control information that allows the drive unit to operate to be switched from the autonomous driving to the manual driving, when a signal of manual driving control is input to the drive control device after the drive unit that performs the autonomous driving is stopped, the manual switching control information may allow the drive unit to perform the manual driving according to the signal of the manual driving control.

In one embodiment, when the processor transmits, to the drive control device, the autonomous switching control information that allows the drive unit to operate to be switched from the manual driving to the autonomous driving, when a signal of autonomous driving control is input to the drive control device after the drive unit that performs the manual driving is stopped, the autonomous switching control information may allow the drive unit to perform autonomous driving according to the signal of the autonomous driving control.

In one embodiment, the shuttle lever may include a leaf spring, and when the shuttle lever is manipulated between the drive and the neutral or between the reverse and the neural, when the user does not hold the shuttle lever, the shuttle lever may be configured to return to the position of the neutral by the leaf spring.

In one embodiment, an electronic device included in an agricultural machine includes a shuttle lever that is manipulatable to be fixed to one of three positions of drive, neutral, and reverse, a sensor that senses a position of the shuttle lever, a transceiver electrically connected to a drive control device including a drive unit of the agricultural machine, and at least one processor electrically connected to the transceiver and the sensor. The processor may be configured to control the transceiver to receive information indicating whether the agricultural machine is operated in the autonomous driving or the manual driving from the drive control device, control the sensor to sense the position of the shuttle lever, transmit, to the drive control device, manual switching control information that allows the drive unit to operate to be switched from the autonomous driving to the manual driving when the shuttle lever is continuously positioned between the drive and the neutral or between the reverse and the neutral for a predetermined time interval or more during the autonomous driving of the agricultural machine, and may control the transceiver to transmit, to the drive control device, control information that allows the drive unit to operate drive or reverse when the shuttle lever is positioned in the drive or the reverse during the manual driving of the agricultural machine. The sensor may include a variable resistor, the variable resistor may be configured such that a value of the variable resistor may be changed according to the position of the shuttle lever, and the sensor may be configured to sense the position of the shuttle lever according to the value of the variable resistor. When the shuttle lever is manipulated to one of the three positions of drive, neutral, and reverse, the shuttle lever may be fixedly positioned at a manipulated position before a subsequent manipulation. When the shuttle lever is manipulated between the drive and the neutral or between the reverse and the neutral, when the user does not hold the shuttle lever, the shuttle lever may be configured to return to the position of the neutral. Further, in some embodiments, the shuttle lever may include a leaf spring, and when the shuttle lever is manipulated between the drive and the neutral or between the reverse and the neural, when the user does not hold the shuttle lever, the shuttle lever may be configured to return to the position of the neutral by the leaf spring.

Various embodiments of the present disclosure provide an electronic device included in an agricultural machine, the electronic device including a shuttle lever that is manipulatable to be fixed to one of three positions of drive, neutral, and reverse, a sensor that senses a position of the shuttle lever, a transceiver electrically connected to a drive control device including a drive unit of the agricultural machine, and at least one processor electrically connected to the transceiver and the sensor. The processor may be configured to control the transceiver to receive information indicating whether the agricultural machine is operated in the autonomous driving or the manual driving from the drive control device, control the sensor to sense the position of the shuttle lever, and transmit, to the drive control device, manual switching control information that allows the drive unit to operate to be switched from the autonomous driving to the manual driving when the shuttle lever is continuously positioned between the drive and the neutral or between the reverse and the neutral for a predetermined time interval or more during the autonomous driving of the agricultural machine. The shuttle lever cannot be fixedly positioned between the drive and the neutral or between the reverse and the neutral, and the shuttle lever may be continuously positioned between the drive and the neutral or between the reverse and the neutral for a predetermined time interval only when the user holds the shuttle lever between the drive and the neutral or between the reverse and the neutral. The sensor may include a variable resistor, and the variable resistor is configured such that a value of the variable resistor may be changed according to the position of the shuttle lever. The sensor may be configured to sense the position of the shuttle lever according to the value of the variable resistor. When the processor transmits, to the drive control device, the manual switching control information that allows the drive unit to operate to be switched from the autonomous driving to the manual driving, when a signal of manual driving control is input to the drive control device after the drive unit that performs the autonomous driving is stopped, the manual switching control information may allow the drive unit to perform the manual driving according to the signal of the manual driving control.

Various embodiments of the present disclosure provide an electronic device included in an agricultural machine, the electronic device including a shuttle lever that is manipulatable to be fixed to one of three positions of drive, neutral, and reverse, a sensor that senses a position of the shuttle lever, a transceiver electrically connected to a drive control device including a drive unit of the agricultural machine, and at least one processor electrically connected to the transceiver and the sensor. The processor may be configured to control the transceiver to receive information indicating whether the agricultural machine is operated in the autonomous driving or the manual driving from the drive control device, control the sensor to sense the position of the shuttle lever, transmit, to the drive control device, manual switching control information that allows the drive unit to operate to be switched from the autonomous driving to the manual driving when the shuttle lever is continuously positioned between the drive and the neutral or between the reverse and the neutral for a predetermined time interval or more during the autonomous driving of the agricultural machine, and may control the transceiver to transmit, to the drive control device, control information that allows the drive unit to be operated based on the autonomous driving regardless of the position of the shuttle lever when the shuttle lever is positioned in the drive, the neutral, or the reverse during the autonomous driving of the agricultural machine. The sensor may include a variable resistor, the variable resistor may be configured such that a value of the variable resistor may be changed according to the position of the shuttle lever, and the sensor may be configured to sense the position of the shuttle lever according to the value of the variable resistor. When the processor transmits, to the drive control device, the manual switching control information that allows the drive unit to operate to be switched from the autonomous driving to the manual driving, when a signal of manual driving control is input to the drive control device after the drive unit that performs the autonomous driving is stopped, the manual switching control information may allow the drive unit to perform the manual driving according to the signal of the manual driving control.

Various embodiments of the present disclosure provide an electronic device included in an agricultural machine, the electronic device including a shuttle lever that is manipulatable to be fixed to one of three positions of drive, neutral, and reverse, a sensor that senses a position of the shuttle lever, a transceiver electrically connected to a drive control device including a drive unit of the agricultural machine, and at least one processor electrically connected to the transceiver and the sensor. The processor may be configured to control the transceiver to receive information indicating whether the agricultural machine is operated in the autonomous driving or the manual driving from the drive control device, control the sensor to sense the position of the shuttle lever, transmit, to the drive control device, manual switching control information that allows the drive unit to operate to be switched from the autonomous driving to the manual driving when the shuttle lever is continuously positioned between the drive and the neutral or between the reverse and the neutral for a predetermined time interval or more during the autonomous driving of the agricultural machine, and may control the transceiver to transmit, to the drive control device, autonomous switching control information that allows the drive unit to operate to be switched from the manual driving to the autonomous driving when the shuttle lever is continuously positioned between the drive and neutral or between the reverse and the neutral for a predetermined time interval or more during the manual driving of the agricultural machine. The sensor may include a variable resistor, the variable resistor may be configured such that a value of the variable resistor may be changed according to the position of the shuttle lever, and the sensor may be configured to sense the position of the shuttle lever according to the value of the variable resistor. Further, when the processor transmits, to the drive control device, the manual switching control information that allows the drive unit to operate to be switched from the autonomous driving to the manual driving, when a signal of manual driving control is input to the drive control device after the drive unit that performs the autonomous driving is stopped, the manual switching control information may allow the drive unit to perform the manual driving according to the signal of the manual driving control.

Various embodiments of the present disclosure can provide an apparatus for controlling a drive unit according to a position of a shuttle lever of an agricultural machine that supports autonomous driving.

Various embodiments of the present disclosure can provide an apparatus for providing switching between autonomous driving and manual driving as a position between drive and neutral or a position between neutral and reverse is newly defined in a shuttle lever including a drive-neutral-reverse structure of an agricultural machine.

Various embodiments of the present disclosure can provide an apparatus capable of determining a control direction of a drive unit in relation to a position of a shuttle lever in an autonomous driving state of an agricultural machine.

Various embodiments of the present disclosure can provide an apparatus capable of controlling switching between manual driving and autonomous driving of an agricultural machine using a shuttle lever.

The effects obtained in the present disclosure are not limited to the effects described above, and other effects not described will be clearly understood by those skilled in the art to which the present disclosure pertains from the following description.

DETAILED DESCRIPTION OF EXEMPLARY EMBODIMENTS

Terms used herein are merely used to describe specific embodiments and may not be intended to limit the scope of other embodiments. Singular expressions may include plural expressions unless clearly otherwise indicated in the context. Terms used herein including technical or scientific terms have the same meanings as those commonly understood by those skilled in the art disclosed in the present disclosure. Terms defined in a general dictionary among the terms used herein may be interpreted as the same or similar meanings as the meanings in the context of the related art and are not interpreted as ideal or excessively formal meanings unless explicitly defined herein. In some cases, even terms defined therein may not be interpreted to exclude embodiments of the present disclosure.

Figure 1:
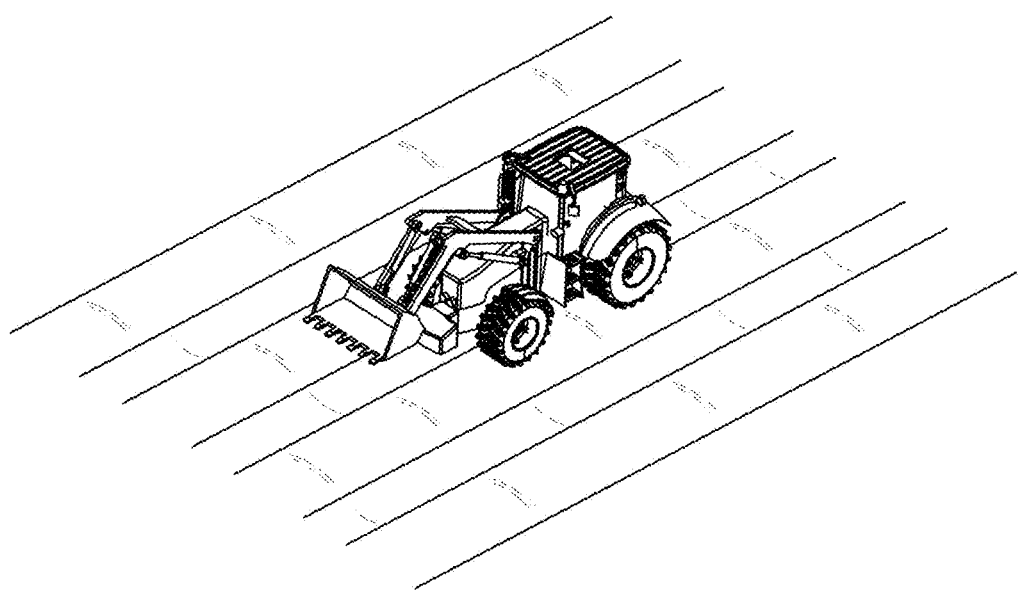
FIG. 1 illustrates an example of driving of an agricultural machine according to various embodiments of the present disclosure.

FIG. 1 illustrates an example of driving of an agricultural machine according to various embodiments of the present disclosure.

Agricultural machines are treated as very important elements to reduce high labor burden and production costs in accordance with labor shortage due to the decrease in and aging of the working population in rural areas. The agricultural machines are intended to perform various works required for farming, capable of performing various types of works such as plowing, rotary work, pest control, and transplanting work, and classified into walk-behind work machines that workers operate while walking along with the agricultural machines and riding-type work machines that workers operate while sitting on drivers' seats provided on the agricultural machines.

Various embodiments of the present disclosure disclose an apparatus that may be applied to an agricultural machine, such as a tractor, which is classified into a riding machine.

Driving of the agricultural machine on a farmland such as a rice paddy or a field involves work.

A user of the agricultural machine may directly perform manual driving control. The user of the agricultural machine may control the agricultural machine to move forward or rearward by directly manipulating a shuttle lever of the agricultural machine and may control a path of the agricultural machine by manipulating a steering wheel.

For the autonomous driving of the agricultural machine, a drive control device for controlling forward or reverse driving may be installed in the agricultural machine. In this case, the agricultural machine may move along a set path and may move forward or rearward according to setting by the user of the agricultural machine. The control of autonomous driving may be set through information exchange between the drive control device installed in the agricultural machine and a user device. The user may generate autonomous driving-related setting information and transmit the generated information to the drive control device using the user device that is a terminal, such as a smartphone or a computer, which may perform information computation and transmission and reception of information. The drive control device includes a transceiver and a processor and is electrically connected to the drive unit of the agricultural machine to control the drive unit. The drive control device may receive the autonomous driving-related setting information from the user device and control the drive unit of the agricultural machine to move forward or rearward according to the autonomous driving-related setting information.

For the autonomous driving of the agricultural machine, a steering control device for controlling a steering wheel may be additionally installed in the agricultural machine. In this case, the steering control device may be configured to control the steering wheel such that the agricultural machine may move along the set path according to the autonomous driving-related setting information received from the user device. The steering control device may be mechanically connected to the steering wheel and configured to rotate the steering wheel along the set path. The steering control device may include a transceiver and receive the autonomous driving-related setting information from the user device. The steering control device may include a processor and control the steering wheel to rotate according to the autonomous driving-related setting information.

Figure 2:
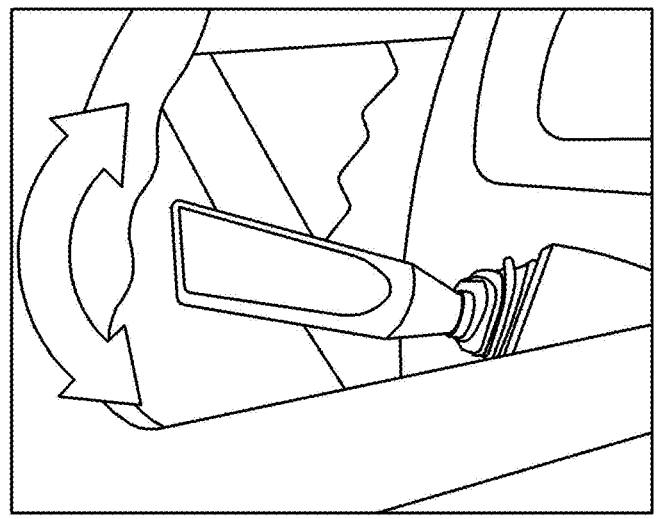
FIG. 2 illustrates an example of a shuttle lever of the agricultural machine according to various embodiments of the present disclosure.

FIG. 2 illustrates an example of a shuttle lever of the agricultural machine according to various embodiments of the present disclosure.

Referring to FIG. 2, the shuttle lever of the agricultural machine is mainly positioned at a left side behind the steering wheel of the agricultural machine.

The shuttle lever of the agricultural machine being generally supplied controls the agricultural machine such that the agricultural machine moves forward when pushed toward an upper end, controls the agricultural machine such that the agricultural machine is in a neutral state when positioned in a middle position, and controls the agricultural machine such that the agricultural machine moves rearward when pushed toward a lower end.

The shuttle lever is not based on the autonomous driving control but assumes that there is only a situation of a manual driving control of the user who directly drives the agricultural machine. Therefore, when an additional autonomous driving control device is installed in the agricultural machine and the user sat on a driver's seat manipulates the shuttle lever while performing the autonomous driving, an autonomous driving-controlled driving direction and a driving direction manipulated by the shuttle lever may collide with each other.

In the manual driving, the shuttle lever is positioned in any one of drive, neutral, and reverse according to a driver's intention for drive, neutral, or reverse, and thus a drive unit of the agricultural machine is controlled to perform drive, neutral, or reverse. However, in the autonomous driving, a command of an autonomous tractor controller (ATC), a position of the shuttle lever, and the driver's intention may be different. This is a problem that occurs because the autonomous driving of the agricultural machine is developed in a manner of coupling the electronic device that supports the autonomous driving to the agricultural machine manufactured based on the manual driving.

Thus, an apparatus that may determine a control direction of the drive unit in relation to the position of the shuttle lever in an autonomous driving state is required.

Further, in the agricultural machine that performs both the manual driving and the autonomous driving, when switching between the manual driving and the autonomous driving may be controlled using the shuttle lever that is a component present in the existing agricultural machine, separate additional control components are not required in the agricultural machine. Thus, an apparatus that may control the switching between the manual driving and the autonomous driving of the agricultural machine using the shuttle lever is required.

Figure 3:
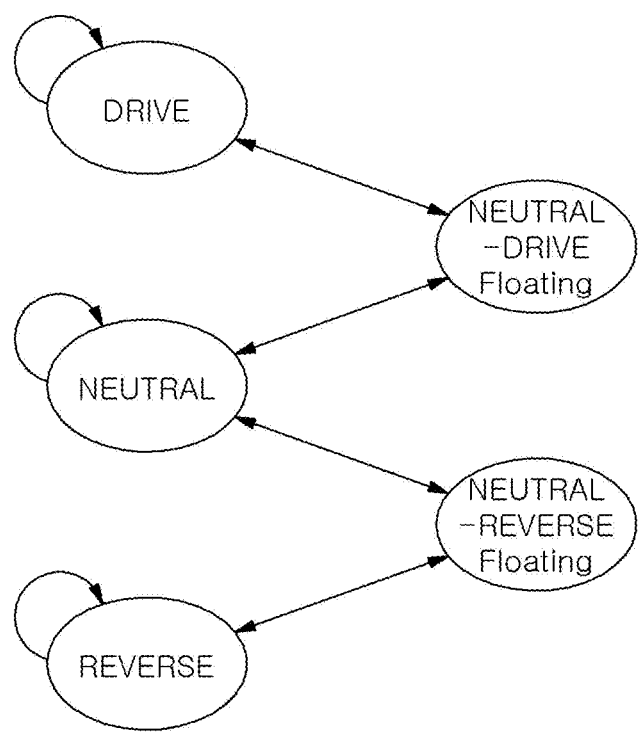
FIG. 3 illustrates an example of a shuttle lever position configuration according to various embodiments of the present disclosure.

FIG. 3 illustrates an example of the shuttle lever position configuration according to various embodiments of the present disclosure.

Figure 4:
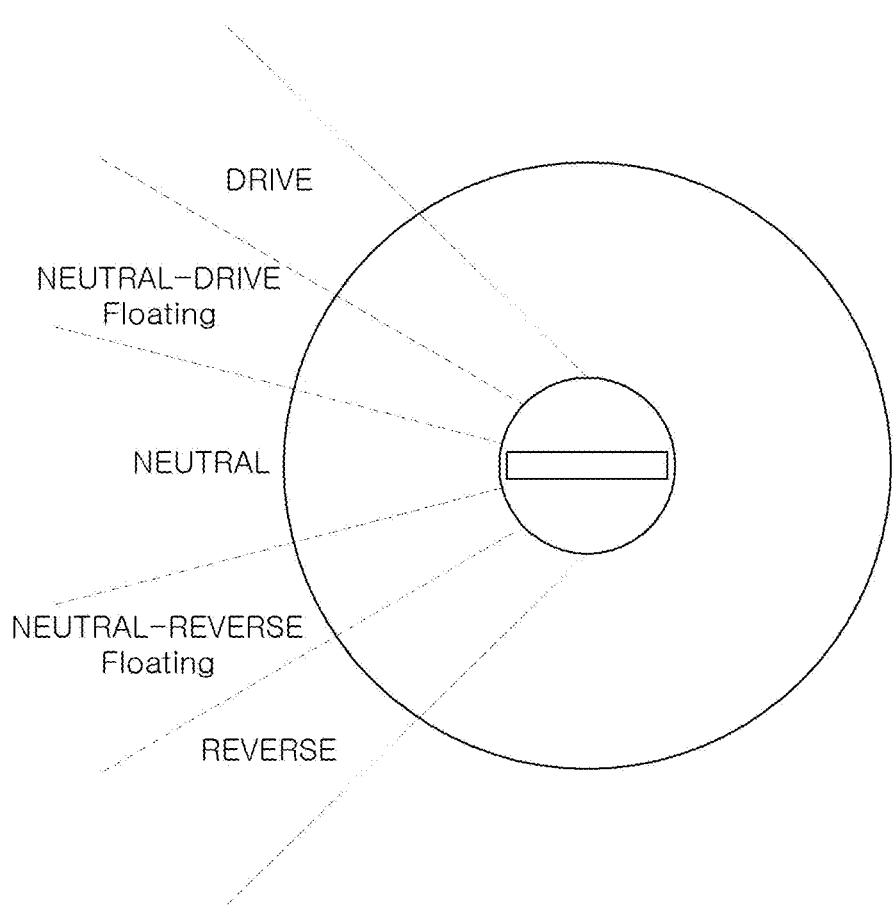
FIG. 4 illustrates an example of the shuttle lever position configuration according to various embodiments of the present disclosure.

FIG. 4 illustrates an example of the shuttle lever position configuration according to various embodiments of the present disclosure.

In various embodiments of the present disclosure, a new control command for a position between drive and neutral or between reverse and neutral is defined in addition to three positions of drive-neutral-reverse of a control structure of the existing shuttle lever.

In various embodiments of the present disclosure, a state in which the shuttle lever is positioned between drive and neutral is defined as a neutral-drive floating state, and a state in which the shuttle lever is positioned between reverse and neutral is defined as a neutral-reverse floating state.

In various embodiments of the present disclosure, the reason why the floating states are defined is that most Korean tractors being currently supplied determine the position of the shuttle lever through a potentiometer (variable resistor) and thus there is an intermediate state between drive and neutral or between reverse and neutral.

In various embodiments of the present disclosure, the position of the shuttle lever may be fixed in the case of drive, neutral, and reverse, but, the shuttle lever may be continuously positioned at a corresponding position only when the user holds the shuttle lever in the corresponding position in the case of the neutral-drive floating state or neutral-reverse floating state. In the case of the neutral-drive floating state or neutral-reverse floating state, the shuttle lever may be configured to return to a neutral position when the user does not hold the shuttle lever. The shuttle lever may be configured to return to the neutral position by a leaf spring. A new control command may be defined by sensing that the user holds the shuttle lever in a specific position with his or her intention.

According to various embodiments of the present disclosure, when the shuttle lever is positioned for a predetermined time interval or more in the neutral-drive floating state or neutral-reverse floating state, a shuttle lever device may transmit a control signal for switching from the autonomous driving to the manual driving or from the manual driving to the autonomous driving to the drive control device that controls the drive unit. Therefore, even when a separate control switch or the like is not added to the agricultural machine, the switching control between the autonomous driving and the manual driving may be performed by the existing devices.

Further, in various embodiments of the present disclosure, when the shuttle lever is positioned in drive, neutral, or reverse while the agricultural machine performs the autonomous driving, the drive unit may be configured to operate based on the autonomous driving regardless of the position of the shuttle lever. Therefore, a collision between manual control based on the position of the shuttle lever during the autonomous driving and control during actual autonomous driving may be resolved.

Figure 5:
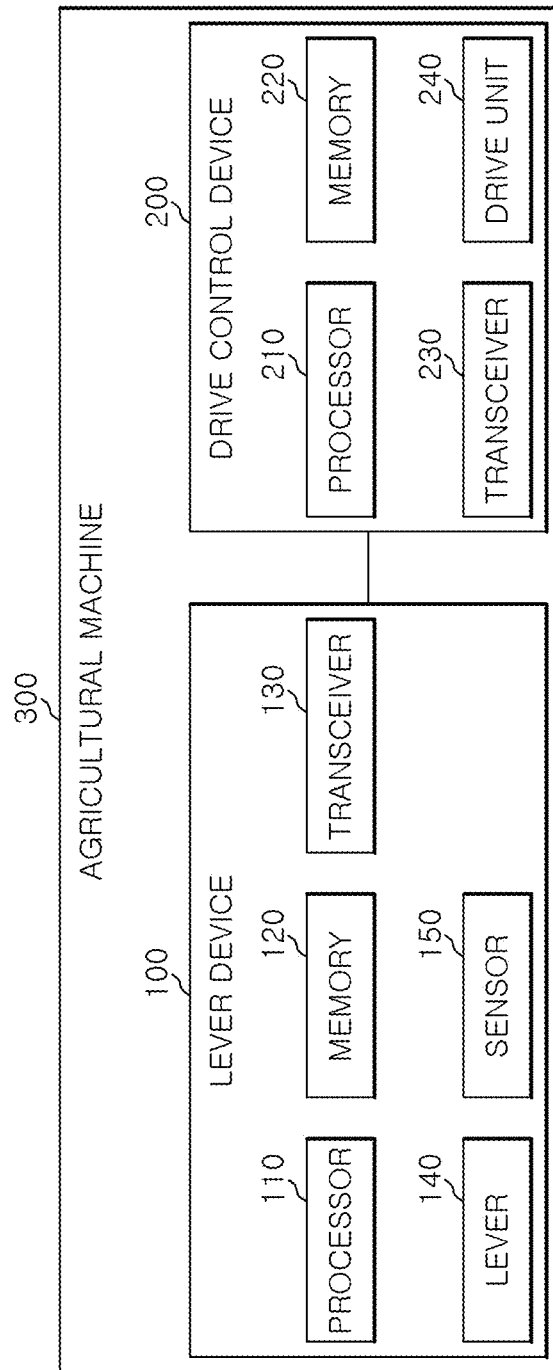
FIG. 5 is a block diagram illustrating an apparatus for controlling a drive unit according to a position of a shuttle lever of an agricultural machine that supports autonomous driving according to various embodiments of the present disclosure.

FIG. 5 is a block diagram illustrating an apparatus for controlling a drive unit according to a position of a shuttle lever of an agricultural machine that supports autonomous driving according to various embodiments of the present disclosure.

Referring to FIG. 5, an agricultural machine 300 includes a shuttle lever device 100 and a drive control device 200. The shuttle lever device 100 includes a processor 110, a memory 120, a transceiver 130, a shuttle lever 140, and a sensor 150. The drive control device 200 includes a processor 210, a memory 220, a transceiver 230, and a drive unit 240. The shuttle lever device 100 and the driving control device 200 may be electrically connected to each other to exchange information or electrical signals to each other.

In the shuttle lever device 100, the processor 110 may implement procedures and/or methods proposed in the present disclosure. The processor 110 controls an overall operation of the shuttle lever device 100. For example, the processor 110 may transmit or receive information or the like through the transceiver 130. Further, the processor 110 writes and reads data into and from the memory 120. Further, the processor 110 receives input of a position of the shuttle lever 140 through the sensor 150. The processor 110 may include at least one processor.

The memory 120 may be connected to the processor 110, the transceiver 130, and the sensor 150 and store information received from an external device such as server through communication of the transceiver 130, information input through the sensor 150, or the like. Further, the memory 120 may be connected to the processor 110 and store data such as a basic program, an application program, setting information, information generated by computation of the processor 110 and the like for operating the processor 110. The memory 120 may be a volatile memory, a non-volatile memory, or a combination of a volatile memory and a non-volatile memory. Further, the memory 120 may provide stored data according to a request of the processor 110.

The transceiver 130 is connected to the processor 110 and transmits and/or receives a signal. The entirety or a portion of the transceiver 130 may be referred to as a transmitter, a receiver, or a transceiver. The transceiver 130 may support wired access systems and at least one of various wireless communication standards such as an institute of electrical and electronics engineers (IEEE) 802.xx system, an IEEE Wi-Fi system, a $3^{rd}$ generation partnership project (3GPP) system, a 3GPP long term evolution (LTE) system, a 3GPP 5G new radio (NR) system, a 3GPP2 system, and Bluetooth that are wireless access systems.

The shuttle lever 140 is a lever for controlling drive, neutral, or reverse in relation of driving of the agricultural machine 300 during the manual driving of the agricultural machine 300.

The sensor 150 is a sensor configured to sense whether the shuttle lever 140 is positioned in drive, neutral, or reverse and whether the shuttle lever 140 is positioned between drive and neutral or between reverse and neutral.

In the drive control device 200, the processor 210 may implement the procedures and/or methods proposed in the present disclosure. The processor 210 controls an overall operation of the drive control device 200. For example, the processor 210 may transmit or receive information or the like through the transceiver 230. Further, the processor 210 writes and reads data in and from the memory 220. Further, the processor 210 controls the drive unit 240. The processor 210 may include at least one processor.

The memory 220 may be connected to the processor 210, the transceiver 230, and the drive unit 240 and store information received from the external device such as through communication of the transceiver 230, signal information input through the drive unit 240, or the like. Further, the memory 220 may be connected to the processor 210 and store data such as a basic program, an application program, setting information, information generated by computation of the processor 210 and the like for operating the processor 210. The memory 220 may be a volatile memory, a non-volatile memory, or a combination of a volatile memory and a non-volatile memory. Further, the memory 220 may provide stored data according to a request of the processor 210.

The transceiver 230 is connected to the processor 210 and transmits and/or receives a signal. The entirety or a portion of the transceiver 230 may be referred to as a transmitter, a receiver, or a transceiver. The transceiver 230 may support wired access systems and at least one of various wireless communication standards such as an IEEE 802.xx system, an IEEE Wi-Fi system, a 3GPP system, a 3GPP LTE system, a 3GPP 5G NR system, a 3GPP2 system, and Bluetooth that are wireless access systems.

The drive unit 240 may be a drive unit of the agricultural machine 300 and include an engine or motor. The drive unit 240 may operate drive, neutral, or reverse according to a control signal of the processor 210.

According to various embodiments of the present disclosure, the shuttle lever device 100 that is an electronic device included in the agricultural machine 300 is provided. The shuttle lever device 100 includes the shuttle lever 140 that may be manipulated to be fixed to one of the three positions of drive, neutral, and reverse, the sensor 150 that is configured to sense the position of the shuttle lever 140, the transceiver 130 electrically connected to the drive control device 200 including the drive unit 240 of the agricultural machine 300, and at least one processor 110 electrically connected to the transceiver 130 and the sensor 150.

According to various embodiments of the present disclosure, the processor 110 is configured to control the transceiver 130 to receive information indicating whether the agricultural machine 300 is operated in the autonomous driving or the manual driving from the drive control device 200 and control the sensor 150 to sense the position of the shuttle lever 140.

According to various embodiments of the present disclosure, when the shuttle lever 140 is continuously positioned between drive and neutral or between reverse and neutral for a predetermined time interval or more during the autonomous driving of the agricultural machine 300, the processor 110 is configured to transmit, to the drive control device 200, manual switching control information that allows the drive unit 240 to be switched from the autonomous driving to the manual driving.

According to the various embodiments of the present disclosure, the shuttle lever 140 cannot be fixed and positioned between drive and neutral or between reverse and neutral.

According to various embodiments of the present disclosure, only when the user holds the shuttle lever 140 between drive and neutral or between reverse and neutral, the shuttle lever 140 may be continuously positioned for a predetermined time interval between drive and neutral or between reverse and neutral.

According to the various embodiments of the present disclosure, when the shuttle lever 140 is manipulated to one of the three positions of drive, neutral, and reverse, the shuttle lever 140 is fixed and positioned at a manipulated position before a subsequent operation.

According to the various embodiments of the present disclosure, when the shuttle lever 140 is manipulated between drive and neutral or between rearward and neutral, when the user does not hold the shuttle lever 140, the shuttle lever 140 is configured to return to a position of the neutral.

According to the various embodiments of the present disclosure, when the shuttle lever 140 is positioned in drive or reverse during the manual driving of the agricultural machine 300, the processor 110 is further configured to control the transceiver 130 to transmit control information that allows the drive unit 240 to operate drive or reverse to the drive control device 200.

According to various embodiments of the present disclosure, when the shuttle lever 140 is positioned in drive or reverse during the autonomous driving of the agricultural machine 300, the processor 110 is further configured to control the transceiver 130 to transmit, to the drive control device 200, control information that allows the drive unit 240 to be operated based on the autonomous driving regardless of the position of the shuttle lever 140.

According to various embodiments of the present disclosure, when the shuttle lever 140 is continuously positioned between drive and neutral or between reverse and neutral for a predetermined time interval or more during the manual driving of the agricultural machine 300, the processor 110 transmits, to the drive control device 200, autonomous switching control information that allows the drive unit 240 to be switched from the manual driving to the autonomous driving.

According to various embodiments of the present disclosure, the sensor 150 includes a variable resistor, the value of the variable resistor is changed according to the position of the shuttle lever 140, and the sensor 150 senses the position of the shuttle lever 140 according to the value of the variable resistor.

According to various embodiments of the present disclosure, when the processor 110 transmits, to the drive control device 200, the manual switching control information that allows the drive unit 240 to operate to be switched from the autonomous driving to the manual driving, when a signal of the manual driving control is input to the drive control device 200 after the drive unit 240 that performs the autonomous driving is stopped, the manual switching control information allows the drive unit 240 to perform the manual driving according to the signal of the manual driving control.

According to various embodiments of the present disclosure, when the processor 110 transmits, to the drive control device 200, the autonomous switching control information that allows the drive unit 240 to operate to be switched from the manual driving to the autonomous driving, when a signal of the autonomous driving control is input to the drive control device 200 after the drive unit 240 that performs the manual driving is stopped, the autonomous switching control information allows the drive unit 240 to perform the manual driving according to the signal of the autonomous driving control.

According to various embodiments of the present disclosure, the shuttle lever 140 includes a leaf spring, and when the shuttle lever 140 is manipulated between drive and neutral or between reverse and neutral, when the user does not hold the shuttle lever 140, the shuttle lever 140 is configured to return to the position of the neutral by the leaf spring.

In some embodiments, the electronic device included in the agricultural machine may include the shuttle lever 140 that may be manipulated to be fixed to one of the three positions of drive, neutral, and reverse, the sensor 150 that is configured to sense the position of the shuttle lever, the transceiver 130 electrically connected to the drive control device including the drive unit of the agricultural machine, and at least one processor 110 electrically connected to the transceiver 130 and the sensor 150. The processor 110 may be configured to control the transceiver 130 to receive the information indicating whether the agricultural machine 300 is operated in the autonomous driving or the manual driving from the drive control device 200, control the sensor 150 to sense the position of the shuttle lever 140, and transmit, to the drive control device 200, the manual switching control information that allows the drive unit 240 to operate to be switched from the autonomous driving to the manual driving when the shuttle lever is continuously positioned between drive and neutral or between reverse and neutral for a predetermined time interval or more during the autonomous driving of the agricultural machine. The shuttle lever 140 may not be fixedly positioned between drive and neutral or between reverse and neutral, and the shuttle lever may be continuously positioned between drive and neutral or between reverse and neutral for a predetermined time interval only when the user holds the shuttle lever between drive and neutral or between reverse and neutral. The sensor 150 may include the variable resistor, and the variable resistor may be configured such that the value of the variable resistor may be changed according to the position of the shuttle lever 140. The sensor 150 may be configured to sense the position of the shuttle lever 140 according to the value of the variable resistor. Further, in some embodiments, when the shuttle lever is manipulated to one of the three positions of drive, neutral, and reverse, the shuttle lever may be fixedly positioned at a manipulated position before a subsequent manipulation. When the shuttle lever is manipulated between drive and neutral or between reverse and neutral, when the user does not hold the shuttle lever, the shuttle lever may be configured to return to the position of the neutral. Further, in some embodiments, the shuttle lever may include a leaf spring, and when the shuttle lever is manipulated between drive and neutral or between reverse and neutral, when the user does not hold the shuttle lever, the shuttle lever may be configured to return to the position of the neutral by the leaf spring.

In some other embodiments, the electronic device included in the agricultural machine may include the shuttle lever that may be manipulated to be fixed to one of the three positions of drive, neutral, and reverse, the sensor that is configured to senses the position of the shuttle lever, the transceiver electrically connected to the drive control device including the drive unit of the agricultural machine, and at least one processor electrically connected to the transceiver and the sensor. The processor may be configured to control the transceiver to receive the information indicating whether the agricultural machine 300 is operated in the autonomous driving or the manual driving from the drive control device, control the sensor 150 to sense the position of the shuttle lever, transmit, to the drive control device 200, the manual switching control information that allows the drive unit to operate to be switched from the autonomous driving to the manual driving when the shuttle lever is continuously positioned between drive and neutral or between reverse and neutral for a predetermined time interval or more during the autonomous driving of the agricultural machine, and control the transceiver 130 to transmit the control information that allows the drive unit 240 to operate drive or reverse to the drive control device when the shuttle lever 140 is positioned in drive or reverse during the manual driving of the agricultural machine 300. The sensor 150 may include the variable resistor, and the variable resistor may be configured such that the value of the variable resistor may be changed according to the position of the shuttle lever 140, and the sensor 150 may be configured to sense the position of the shuttle lever 140 according to the value of the variable resistor. When the processor 110 transmits, to the drive control device, the manual switching control information that allows the drive unit 240 to operate to be switched from the autonomous driving to the manual driving, when the signal of the manual driving control is input to the drive control device after the drive unit 240 that performs the autonomous driving is stopped, the manual switching control information may allow the drive unit to perform the manual driving according to the signal of the manual driving control.

In some other embodiments, the electronic device included in the agricultural machine may include the shuttle lever 140 that may be manipulated to be fixed to one of the positions of drive, neutral, and reverse, the sensor 150 that is configured to sense the position of the shuttle lever 140, the transceiver 130 electrically connected to the drive control device 200 including the drive unit 240 of the agricultural machine, and at least one processor 110 electrically connected to the transceiver 130 and the sensor 150. The processor 110 may be configured to control the transceiver 130 to receive information indicating whether the agricultural machine is operated in the autonomous driving or the manual driving from the drive control device 200, control the sensor 150 to sense the position of the shuttle lever 140, transmit, to the drive control device 200, the manual switching control information that allows the drive unit 240 to operate to be switched from the autonomous driving to the manual driving when the shuttle lever 140 is continuously positioned between drive and neutral or between reverse and neutral for a predetermined time interval or more during the autonomous driving of the agricultural machine, and may control the transceiver 130 to transmit, to the drive control device 200, the control information that allows the drive unit 240 to be operated based on the autonomous driving regardless of the position of the shuttle lever 140 when the shuttle lever 140 is positioned in drive, neutral, or reverse during the autonomous driving of the agricultural machine. The sensor 150 may include the variable resistor, the variable resistor may be configured such that the value of the variable resistor may be changed according to the position of the shuttle lever 140, and the sensor 150 may be configured to detect the position of the shuttle lever 140 according to the value of the variable resistor. Further, in some embodiments, when the processor 110 transmits, to the drive control device 200, the manual switching control information that allows the drive unit 240 to operate to be switched from the autonomous driving to the manual driving, when the signal of the manual driving control is input to the drive control device 200 after the drive unit 240 that performs the autonomous driving is stopped, the manual switching control information may allow the drive unit 240 to perform the manual driving according to the signal of the manual driving control.

In some other embodiments, the electronic device included in the agricultural machine may include the shuttle lever 140 that may be manipulated to be fixed to one of the three positions of drive, neutral, and reverse, the sensor 150 that is configured to sense the position of the shuttle lever 140, the transceiver 130 electrically connected to the drive control device 200 including the drive unit 240 of the agricultural machine, and at least one processor 110 electrically connected to the transceiver 130 and the sensor 150. The processor 110 may be configured to control the transceiver 130 to receive the information indicating whether the agricultural machine is operated in the autonomous driving or the manual driving from the drive control device 200, control the sensor 150 to sense the position of the shuttle lever 140, transmit, to the drive control device 200, the manual switching control information that allows the drive unit 240 to operate to be switched from the autonomous driving to the manual driving when the shuttle lever 140 is continuously positioned between drive and neutral or between reverse and neutral for a predetermined time interval or more during the autonomous driving of the agricultural machine, and transmit, to the drive control device 200, autonomous switching control information that allows the drive unit 240 to operate to be switched from the manual driving to the autonomous driving when the shuttle lever 140 is continuously positioned between drive and neutral or between reverse and neutral for a predetermined time interval or more during the manual driving of the agricultural machine. The sensor 150 may include the variable resistor, the variable resistor may be configured such that the value of the variable resistor may be changed according to the position of the shuttle lever 140, and the sensor 150 may be configured to sense the position of the shuttle lever 140 according to the value of the variable resistor. Further, in some embodiments, when the processor 110 transmits, to the drive control device 200, the manual switching control information that allows the drive unit 240 to operate to be switched from the autonomous driving to the manual driving, when the signal of the manual driving control is input to the drive control device 200 after the drive unit 240 that performs the autonomous driving is stopped, the manual switching control information may allow the drive unit 240 to perform the manual driving according to the signal of the manual driving control.

When embodiments of the present disclosure are implemented using hardware, application specific integrated circuits (ASICs), digital signal processors (DSPs), digital signal processing devices (DSPDs), programmable logic devices (PLDs), field programmable gate arrays (FPGAs), or the like that are configured to perform the present disclosure may be provided in the processor of the present disclosure.

Meanwhile, the above-described method may be written by a computer-executable program and implemented in a general-purpose digital computer that operates the program using a computer-readable storage medium. Further, a structure of data used in the above-described method may be recorded on the computer-readable storage medium through various means. Program storage devices, which may be used for storage devices including executable computer codes for performing various methods of the present disclosure, should not be understood to include transient objects such as carrier waves or signals. The computer-readable storage medium includes storage media such as magnetic storage media (e.g., a read-only memory (ROM), a floppy disk, a hard disk, and the like) and optical readable media (e.g., a compact disk read-only memory (CD-ROM), a digital versatile disc (DVD), and the like).

In the above-described embodiments, components and features of the present disclosure are combined in a predetermined form. The components or features should be considered selectively unless explicitly stated otherwise. The components or features may be implemented in a form in which the components or features are not combined with the other components or features. Further, the embodiments of the present disclosure may be configured by combining some components and/or features. An order of operations described in the embodiments of the present disclosure may be changed. Some components or features of one embodiment may be included in another embodiment or may be replaced with components and features corresponding to another embodiment. It is obvious that an embodiment may be configured by combining claims that are not explicitly cited in the appended claims or include a novel claim by amendment after filing.

It is apparent to those skilled in the art to which the present disclosure pertains that the present disclosure may be embodied in other forms without departing from the technical ideas and essential features of the present disclosure. Thus, the embodiments should be considered in all aspects as illustrative rather than limitative. The scope of rights of the present disclosure should be determined by reasonable interpretation of the appended claims and all possible changes within the equivalent scope of the present disclosure.

An electronic device according to embodiments of the present application is useful for an autonomous agricultural machine. As a result, the electronic device according to embodiments of the present application is likely to be used in an agricultural industry in which a frequency of use of the autonomous agricultural machine has recently increased.

The invention claimed is:

1. An electronic device included in an agricultural machine, the electronic device comprising:
   a shuttle lever that is manipulatable to be fixed to one of three positions of drive, neutral, and reverse;
   a sensor configured to sense a position of the shuttle lever;
   a transceiver electrically connected to a drive control device including a drive unit of the agricultural machine; and
   at least one processor electrically connected to the transceiver and the sensor,
   wherein the processor is configured to:
   control the transceiver to receive information indicating whether the agricultural machine is operated in autonomous driving or manual driving from the drive control device;
   control the sensor to sense the position of the shuttle lever; and
   transmit, to the drive control device, manual switching control information that allows the drive unit to operate to be switched from the autonomous driving to the manual driving when the shuttle lever is positioned between the drive and neutral or between the reverse and the neutral for a predetermined time interval or longer during the autonomous driving of the agricultural machine.

2. The electronic device of claim 1, wherein the shuttle lever is not fixedly positioned between the drive position and the neutral position or between the reverse position and the neutral position, and
   the shuttle lever is positioned between the drive position and the neutral position or between the reverse position and the neutral position for the predetermined time interval when a user holds the shuttle lever between the drive position and the neutral position or between the reverse position and the neutral position.

3. The electronic device of claim 2, wherein, when the shuttle lever is manipulated to one of the three positions of drive, neutral, and reverse, the shuttle lever is fixedly positioned at a manipulated position before a subsequent manipulation, and
   when the shuttle lever is manipulated between the drive position and the neutral position or between the reverse position and the neutral position, and when the user does not hold the shuttle lever, the shuttle lever is configured to return to the position of the neutral.

4. The electronic device of claim 1, wherein the processor is further configured to control the transceiver to transmit, to the drive control device, control information that allows the drive unit to operate the drive position or the reverse position when the shuttle lever is positioned in the drive position or the reverse position during the manual driving of the agricultural machine.

5. The electronic device of claim 1, wherein the processor is further configured to control the transceiver to transmit, to the drive control device, control information that allows the drive unit to be operated based on the autonomous driving regardless of the position of the shuttle lever when the shuttle lever is positioned in the drive position, the neutral position, or the reverse position during the autonomous driving of the agricultural machine.

6. The electronic device of claim 1, wherein the processor is configured to control the transceiver to transmit, to the drive control device, autonomous switching control information that allows the drive unit to operate to be switched from the manual driving to the autonomous driving when the shuttle lever is positioned between the drive position and the neutral position or between the reverse position and the neutral position for a predetermined time interval or more during the manual driving of the agricultural machine.

7. The electronic device of claim 1, wherein the sensor includes a variable resistor,
the variable resistor is configured such that a value of the variable resistor is changed according to the position of the shuttle lever, and
the sensor is configured to sense the position of the shuttle lever according to the value of the variable resistor.

8. The electronic device of claim 1, wherein, when the processor transmits, to the drive control device, the manual switching control information that allows the drive unit to operate to be switched from the autonomous driving to the manual driving, when a signal of manual driving control is input to the drive control device after the drive unit that performs the autonomous driving is stopped, the manual switching control information allows the drive unit to perform the manual driving according to the signal of the manual driving control.

9. The electronic device of claim 6, wherein, when the processor transmits, to the drive control device, the autonomous switching control information that allows the drive unit to operate to be switched from the manual driving to the autonomous driving, when a signal of autonomous driving control is input to the drive control device after the drive unit that performs the manual driving is stopped, the autonomous switching control information allows the drive unit to perform autonomous driving according to the signal of the autonomous driving control.

10. The electronic device of claim 3, wherein the shuttle lever includes a leaf spring, and
when the shuttle lever is manipulated between the drive position and the neutral position or between the reverse position and the neutral position, when the user does not hold the shuttle lever, the shuttle lever is configured to return to the position of the neutral by the leaf spring.

* * * * *